(12) United States Patent
Hekstra et al.

(10) Patent No.: US 9,830,879 B2
(45) Date of Patent: Nov. 28, 2017

(54) DISPLAY APPARATUS AND TOUCH DISPLAY APPARATUS

(71) Applicant: InnoLux Corporation, Jhu-Nan, Miao-Li County (TW)

(72) Inventors: Gerben Hekstra, Jhu-Nan (TW); Hidetoshi Watanabe, Jhu-Nan (TW); Cheng-Hsiao Lin, Jhu-Nan (TW); Ming-Chao Hsu, Jhu-Nan (TW); Yuko Furui, Jhu-Nan (TW)

(73) Assignee: InnoLux Corporation, Jhu-Nan, Miao-Li County (TW)

( * ) Notice: Subject to any disclaimer, the term of this patent is extended or adjusted under 35 U.S.C. 154(b) by 192 days.

(21) Appl. No.: 14/802,332

(22) Filed: Jul. 17, 2015

(65) Prior Publication Data

US 2016/0049129 A1    Feb. 18, 2016

(30) Foreign Application Priority Data

Aug. 14, 2014 (TW) .............................. 103127976 A

(51) Int. Cl.
*G09G 3/36* (2006.01)
*G06F 3/041* (2006.01)

(52) U.S. Cl.
CPC ......... *G09G 3/3688* (2013.01); *G06F 3/0412* (2013.01); *G06F 3/0416* (2013.01); *G09G 2300/0426* (2013.01); *G09G 2310/0297* (2013.01); *G09G 2320/0223* (2013.01)

(58) Field of Classification Search
CPC ......... G09G 3/3688; G09G 2300/0426; G09G 2310/0297; G09G 2320/0223; G06F 3/0416; G06F 3/0412
See application file for complete search history.

(56) References Cited

U.S. PATENT DOCUMENTS

| | | | | |
|---|---|---|---|---|
| 2003/0179164 A1* | 9/2003 | Shin | ..................... | G09G 3/3233 345/76 |
| 2005/0195177 A1* | 9/2005 | Tai | ........................ | G09G 3/3685 345/204 |
| 2014/0028882 A1* | 1/2014 | Okano | ................ | H04N 5/3653 348/294 |
| 2015/0161954 A1* | 6/2015 | Tokita | .................. | G06F 3/0412 345/174 |
| 2015/0220204 A1* | 8/2015 | Noguchi | ............... | G06F 3/0412 345/174 |

\* cited by examiner

*Primary Examiner* — Kumar Patel
*Assistant Examiner* — Amy C Onyekaba
(74) *Attorney, Agent, or Firm* — Muncy, Geissler, Olds & Lowe, P.C.

(57) ABSTRACT

A display apparatus includes a multiplexer circuit, a driving unit, a first control line and a second control line. The multiplexer circuit includes a plurality of switch units. The first control line is electrically connected with the switch units and the driving unit. The second control line is electrically connected with the switch units and the driving unit. A maximum time constant from the driving unit to the switch units is less than R*C/4, wherein R represents the equivalent resistance of the portion of the first control line between the two switch units which are the farthest from each other, and C represents the equivalent capacitance of the portion of the first control line between the two switch units which are the farthest from each other.

9 Claims, 8 Drawing Sheets

DISPLAY APPARATUS AND TOUCH DISPLAY APPARATUS

CROSS REFERENCE TO RELATED APPLICATIONS

This Non-provisional application claims priority under 35 U.S.C. §119(a) on patent application No(s). 103127976 filed in Taiwan, Republic of China on Aug. 14, 2014, the entire contents of which are hereby incorporated by reference.

BACKGROUND OF THE INVENTION

Field of Invention

The invention relates to a display apparatus and a touch display apparatus.

Related Art

For the active matrix panel, each data line will obtain a shorter charging time with the higher definition. In some panels, a one-to-many multiplexer is generally used for the data line bus and the sequential control signals are also used to control the switches of the multiplexer, and therefore the data lines can be sequentially charged. Accordingly, for an active matrix LCD (liquid crystal display) device with the definition of FHD (1080*1920) and the scan frequency of 60 times per second, the charging time of each data line is about equal to (1/60)*(1/1920)*(1/3) when using a one-to-three multiplexer. However, the delay problem will be generated when the signal of the control line travels for a longer path to reach the farther switch of the multiplexer from the driver IC, i.e. leading to a larger time constant τ, and therefore the signal delay is brought about. Moreover, with the higher definition, the signal delay problem will become worse.

In the conventional art, the multiplexer bus, the driving unit and the control lines connecting the multiplexer bus and the driving unit are disposed on the display panel. For the multiplexer bus of the display panel, due to the actual layout factor, the signals usually leave the driving unit through the corresponding control lines and enter into the two ends of the multiplexer bus. Because the maximum (or maximum delay) time constant τ and the resistance and the capacitance of the signal transmission path have the positive correlation, the maximum (or maximum delay) time constant τ will occur at the central portion of the multiplexer bus.

Therefore, it is an important subject to provide a display apparatus and a touch display apparatus whereby the maximum time constant from the control line to the multiplexer can be reduced, so as to enhance the display quality and efficiency.

SUMMARY OF THE INVENTION

In view of the foregoing subject, an objective of the invention is to provide a display apparatus and a touch display apparatus whereby the maximum time constant from the control line to the multiplexer can be reduced, so as to enhance the display quality and efficiency.

To achieve the above objective, a display apparatus according to the invention includes a multiplexer circuit, a driving unit, a first control line and a second control line. The multiplexer circuit includes a plurality of switch units. The first control line is electrically connected with the switch units and the driving unit. The second control line is electrically connected with the switch units and the driving unit. A maximum time constant from the driving unit to the switch units is less than R*C/4, wherein R represents the equivalent resistance of the portion of the first control line between the two switch units which are the farthest from each other, and C represents the equivalent capacitance of the portion of the first control line between the two switch units which are the farthest from each other.

In one embodiment, the display apparatus further comprises a plurality of thin film transistor units and a plurality of wires. The multiplexer circuit is electrically connected with the thin film transistor units through the wires.

In one embodiment, the driving unit includes a plurality of pins, and the first control line and the second control line are electrically connected to the different pins of the driving unit.

In one embodiment, the display apparatus further comprises a third control line. The first control line and the third control line at least have two connection nodes.

In one embodiment, a part of the third control line is disposed under the driving unit.

In one embodiment, the first control line is electrically connected with the switch units through a buffer unit.

In one embodiment, a connection node between the first control line and the multiplexer circuit is located between any two of the switch units.

In one embodiment, the display apparatus further comprises a substrate on which the multiplexer circuit, the driving unit, the first control line and the second control line are disposed.

To achieve the above objective, a touch display apparatus according to the invention comprises a backlight unit, a protection board and a display apparatus. The protection board is disposed above the backlight unit. The display apparatus is disposed between the backlight unit and the protection board and comprises a substrate, a touch circuit, a multiplexer circuit, a driving unit, a first control line and a second control line. The touch circuit is disposed between the protection board and the substrate. The multiplexer circuit is disposed on the substrate and includes a plurality of switch units. The first control line is electrically connected with the switch units and the driving unit. The second control line is electrically connected with the switch units and the driving unit. A maximum time constant from the driving unit to the switch units is less than R*C/4, R represents the equivalent resistance of the portion of the first control line between the two switch units which are the farthest from each other, and C represents the equivalent capacitance of the portion of the first control line between the two switch units which are the farthest from each other.

In one embodiment, the driving unit is electrically connected with the touch circuit and the multiplexer circuit.

As mentioned above, in the display apparatus and touch display apparatus of the invention, the first control line and the second control line are disposed so that a maximum time constant from the driving unit to the switch units can be less than R*C/4. In comparison with the conventional art, this invention can reduce the maximum time constant so as to enhance the charging efficiency of the data line and further to enhance the display quality and efficiency. Besides, the charging time of the data line is shorter for the high-definition display apparatus and touch display apparatus, so the charging efficiency thereof is more important. Accordingly, this invention can bring more outstanding effectiveness when applied to the high-definition display product or touch apparatus.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
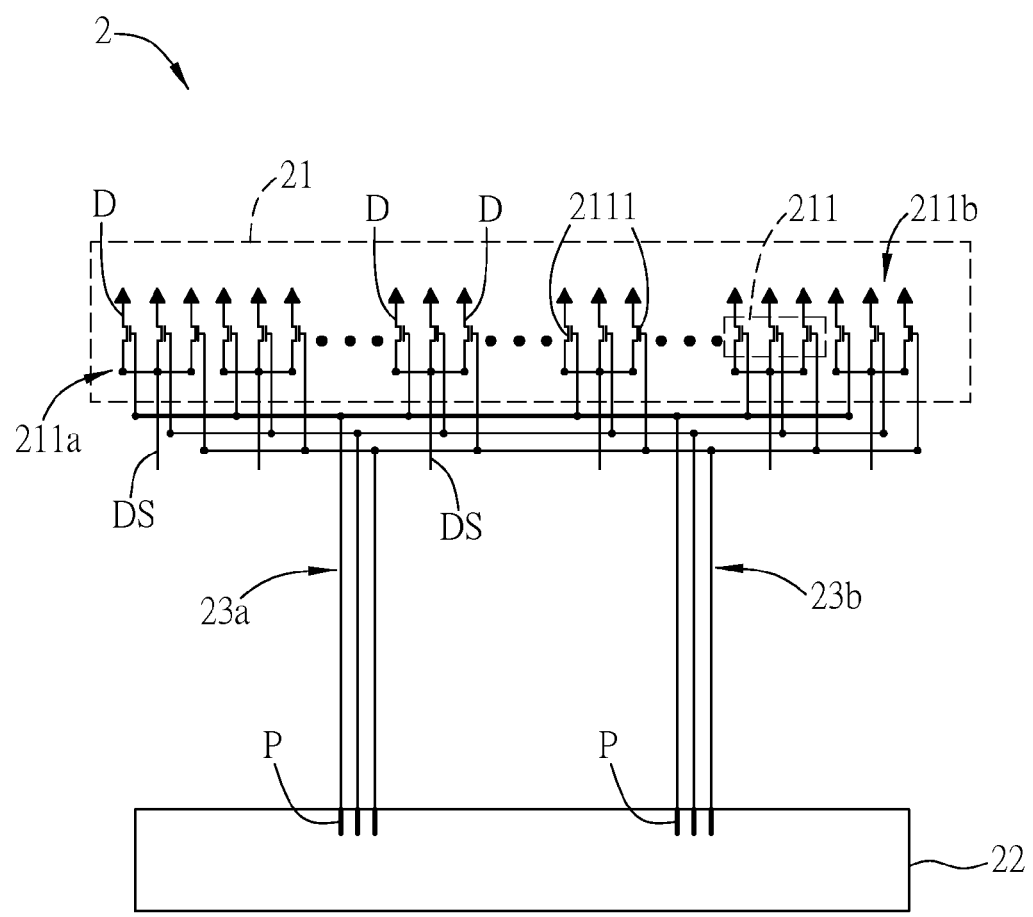
FIG. 1 is a schematic diagram of a display apparatus of an embodiment of the invention.

FIG. 1 is a schematic diagram of a display apparatus 2 of an embodiment of the invention. As shown in FIG. 1, the display apparatus 2 includes a multiplexer circuit 21, a driving unit 22, a first control line 23a and a second control line 23b. The display apparatus 2 is not limited in type, which can be, for example, a non-self-luminous display apparatus such as an LCD apparatus, or a self-luminous display apparatus such as an organic light emitting diode (OLED) display apparatus, or another active matrix display apparatus, or a display apparatus with other functions such as a touch display apparatus. In this embodiment, the display apparatus 2 is an LCD apparatus for example, and the LCD panel is made by the COG (chip on glass) technology. The driving unit 22, the first control line 23a and the second control line 23b are disposed on a substrate. In this embodiment, the multiplexer circuit 21 is also disposed on the substrate, which is a glass substrate for example.

The multiplexer circuit 21 includes a plurality of switch units 2111. Herein, the multiplexer circuit 21 is used to drive the pixels, so the display apparatus further includes a plurality of wires D and a plurality of thin film transistor (TFT) units (not shown). The multiplexer circuit 21 is electrically connected with the TFT units through the wires D (including the data lines). Besides, since a pixel includes three sub-pixels in this embodiment, three switch units 2111 (such as three transistors) constitute a switch unit group 211 and correspond to three sub-pixels. A first end (such as the drain) of each of the switch units 2111 is connected to a wire D to drive the sub-pixel, and a second end (such as the source) of each of the switch units 2111 is connected to a data signal line DS. Although the second ends of the three switch units 2111 of the same group are all connected to the same data signal line DS, the three switch units 2111 still can receive the corresponding data signals by being turned on at different times.

The driving unit 22 can drive the multiplexer circuit 21 by, for example, the first control line 23a, the second control line 23b and the data signal line DS. In this embodiment, the driving unit 22 is formed on the substrate by the COG technology.

In this embodiment, the first control line 23a and the second control line 23b are connected to a third end (such as the gate) of the switch unit 2111. Furthermore, the driving unit 22 is electrically connected with the switch units 2111 through the first control line 23a and the second control line 23b to further drive the multiplexer circuit 21. Herein for example, there are three first control lines 23a and three second control lines 23b so as to correspond to three switch units 2111. A connection node between the first control line 23a and the multiplexer circuit 21 in this embodiment is located between any two switch units, and particularly, the connection node between the first control line 23a and the multiplexer circuit 21 in this embodiment is located between any two switch unit groups 211. Herein for example, the first control line 23a and the second control line 23b are disposed on the left and right sides of the switch unit groups 211, respectively, and are connected with the non-leftmost and non-rightmost switch unit groups 211, respectively. Moreover, the control lines 23a, 23b are connected to the different pins P of the driving unit 22.

A maximum (or maximum delay) time constant from the driving unit 22 to the switch units 2111 is less than $R*C/4$, wherein R represents the equivalent resistance of the portion of the first control line 23a (marked by the bold line) between the two switch units 2111 which are the farthest from each other (here are the leftmost switch units 2111 of the switch unit groups 211a and 211b, which are connected to the first control line 23a), and C represents the equivalent capacitance of the above-mentioned portion of the first control line. Since the time required for the control signals reaching the switch units 2111 through the first control line 23a is different, the switch unit 2111 farther from the first control line 23a will undergo the delay problem. However, in this embodiment, the first control line 23a and the second control line 23b are disposed so that a maximum time constant from the driving unit 22 to the switch units 2111 can be less than $R*C/4$. Herein for example, the maximum time constant is substantially equal to $R*C/16$ (i.e. $(R/4)*(C/4)$). In comparison with the conventional art, this embodiment can reduce the maximum time constant so as to enhance the wire charging efficiency and further to enhance the display quality and efficiency.

The display apparatus of this embodiment can have variations, some of which are illustrated by FIGS. 2 to 6.

Figure 2:
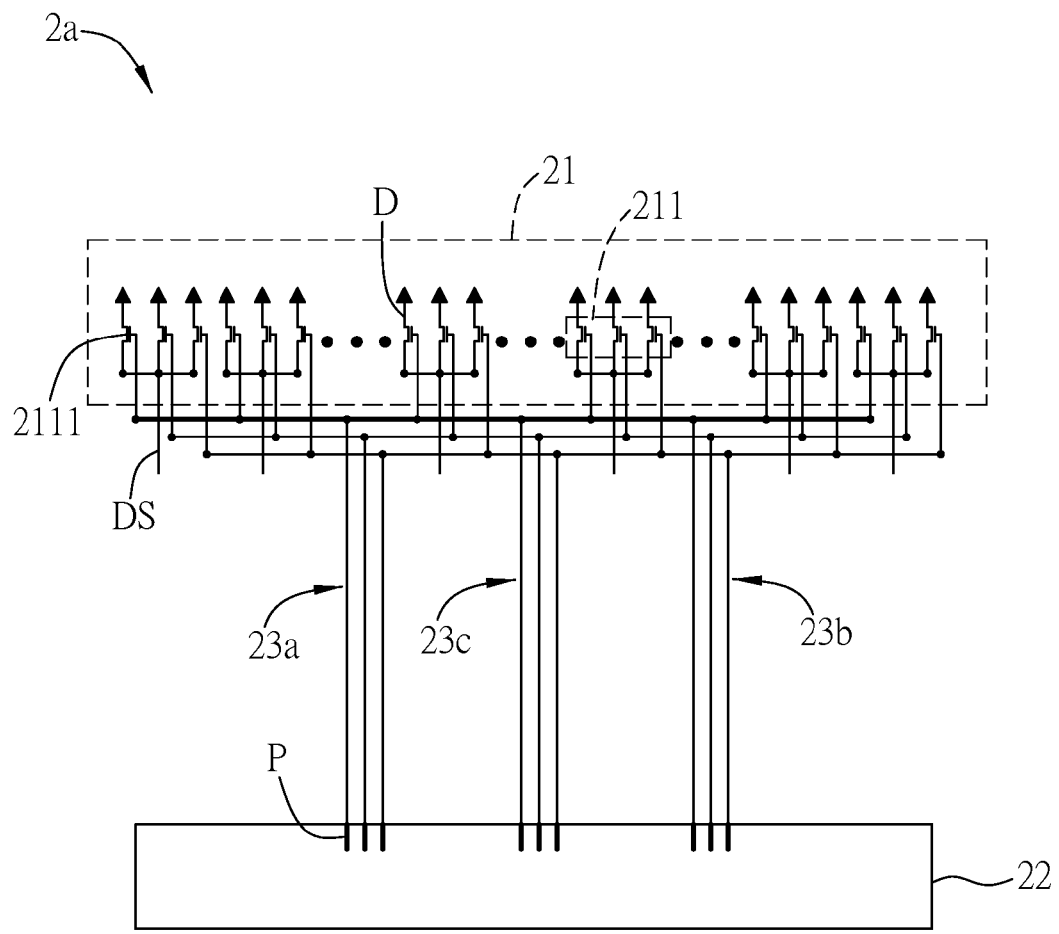
FIGS. 2 to 6 are schematic diagram of variations of a display apparatus of an embodiment of the invention.

FIG. 2 is a schematic diagram of a display apparatus 2a of a variation of an embodiment of the invention. As shown in FIG. 2, the main difference from the display apparatus 2 is that the display apparatus 2a further includes a third control line 23c. The first control line 23a, the second control line 23b and the third control line 23c are connected to the different pins P of the driving unit 22. In this embodiment, there are three third control lines 23c to correspond to the three switch units 2111 of the switch unit group 211.

A maximum time constant from the driving unit 22 to the switch units 2111 is less than $R*C/4$, wherein R represents the equivalent resistance of the portion of the first control line 23a (marked by the bold line) between the two switch units 2111 which are the farthest from each other, and C represents the equivalent capacitance of the above-mentioned portion of the first control line 23a. Since the time required for the control signals reaching the switch units 2111 through the first control line 23a is different, the switch unit 2111 farther from the first control line 23a will undergo the delay problem. However, in this embodiment, the first control line 23a, the second control line 23b and the third control line 23c are disposed so that a maximum time constant from the driving unit 22 to the switch units 2111 can be less than $R*C/4$. Herein for example, the maximum time constant is substantially equal to $R*C/36$ (i.e. $(R/6)*(C/6)$). In comparison with the conventional art, this embodiment can reduce the maximum time constant so as to enhance the wire charging efficiency and further to enhance the display quality and efficiency.

Since other technical features of the display apparatus 2a can be comprehended by referring to the above embodiment, the related illustration is omitted here for conciseness. Moreover, if the quantity of the control lines electrically connected to the same switch unit 2111 in this embodiment is n, the maximum time constant τ is illustrated as the following equation.

$$\tau_n = \frac{RC}{(2n)^2}$$

Figure 3:
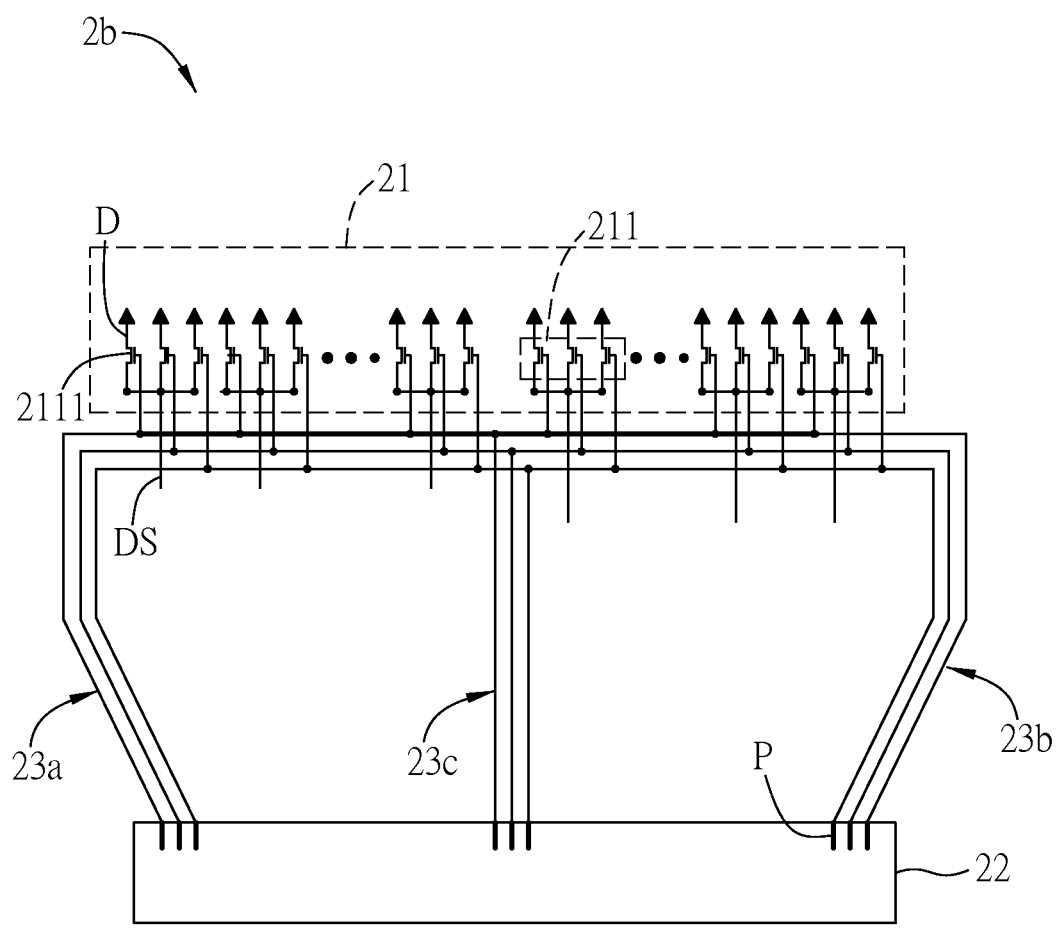

FIG. 3 is a schematic diagram of a display apparatus 2b of a variation of an embodiment of the invention. As shown in FIG. 3, the display apparatus 2b includes the first control line 23a, the second control line 23b and the third control line 23c. The first control line 23a, the second control line 23b and the third control line 23c are disposed on the left, right and middle sides of the multiplexer circuit 21, respectively. The main difference from the display apparatus 2 is that at least one of the first control line 23a, the second control line 23b and the third control line 23c is outputted from an edge side of the driving unit 22. The first control line 23a, the second control line 23b and the third control line 23c are connected to the different pins of the driving unit 22.

As shown in FIG. 3, a maximum time constant from the driving unit 22 to the switch units 2111 is less than R*C/4, wherein R represents the equivalent resistance of the portion of the first control line 23a (marked by the bold line) between the two switch units 2111 which are the farthest from each other, and C represents the equivalent capacitance of the above-mentioned portion of the first control line 23a. Since the time required for the control signals reaching the switch units 2111 through the first control line 23a (or the second control line, or the third control line) is different, the switch unit 2111 farther from the first control line 23a (or the second control line, or the third control line) will undergo the delay problem. However, in this embodiment, the first control line 23a, the second control line 23b and the third control line 23c are disposed so that a maximum time constant from the driving unit 22 to the switch units 2111 can be less than R*C/4. Herein for example, the maximum time constant is substantially equal to R*C/16 (i.e. (R/4)*(C/4)). In comparison with the conventional art, this embodiment can reduce the maximum time constant so as to enhance the wire charging efficiency and further to enhance the display quality and efficiency.

Figure 4:
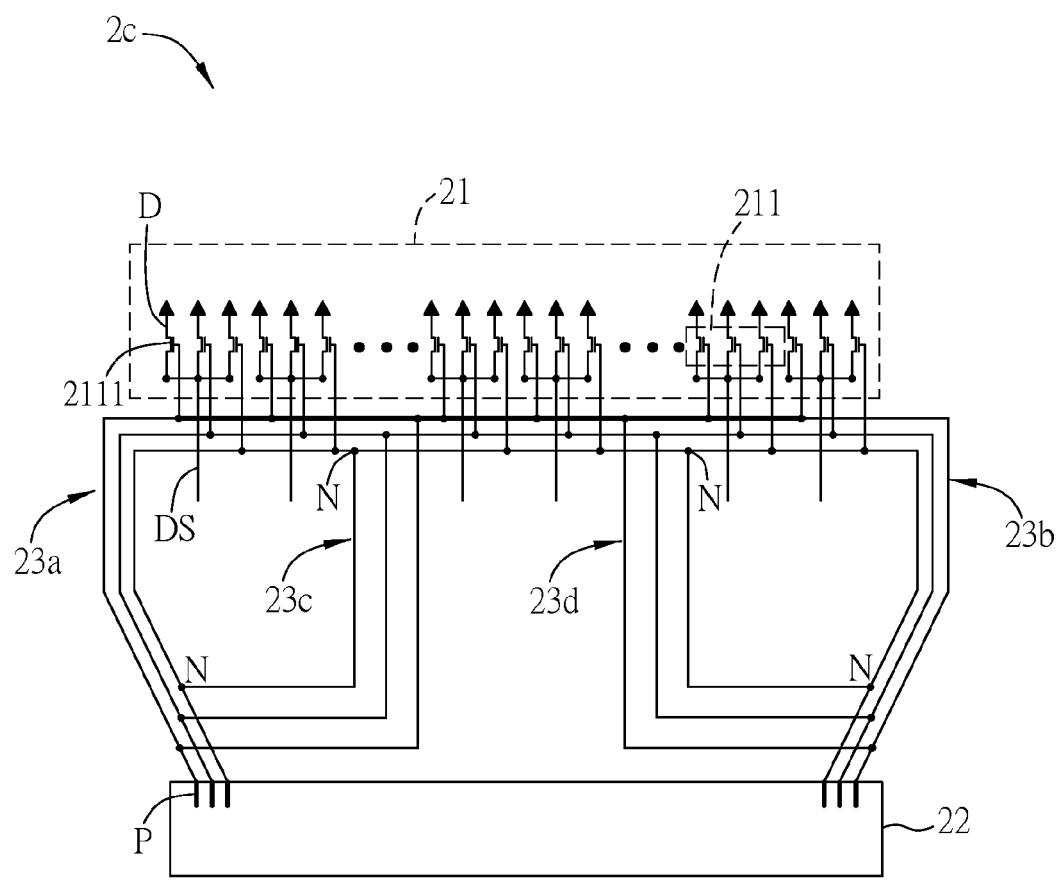

FIG. 4 is a schematic diagram of a display apparatus 2c of a variation of an embodiment of the invention. As shown in FIG. 4, the main difference from the display apparatus 2 is that the display apparatus 2c includes the first control line 23a, the second control line 23b, the third control line 23c and the fourth control line 23d. The first control line 23a and the second control line 23b are outputted from the opposite sides of the driving unit 22 and connected to the different pins P of the driving unit 22. Herein for example, the first control lines 23a and the third control lines 23c at least have two connection nodes N, and the second control lines 23b and the fourth control lines 23d at least have two connection nodes N. Herein, one first control line 23a, one second control line 23b, one third control line 23c and one fourth control line 23d collectively use two pins P of the driving unit 22.

Likewise, in this embodiment, the first control line 23a, the second control line 23b, the third control line 23c and the fourth control line 23d are disposed so that a maximum time constant from the driving unit 22 to the switch units 2111 can be less than R*C/4, wherein R represents the equivalent resistance of the portion of the first control line 23a (marked by the bold line) between the two switch units 2111 which are the farthest from each other, and C represents the equivalent capacitance of the above-mentioned portion of the first control line 23a. In comparison with the conventional art, this embodiment can reduce the maximum time constant so as to enhance the wire charging efficiency and further to enhance the display quality and efficiency.

Figure 5:
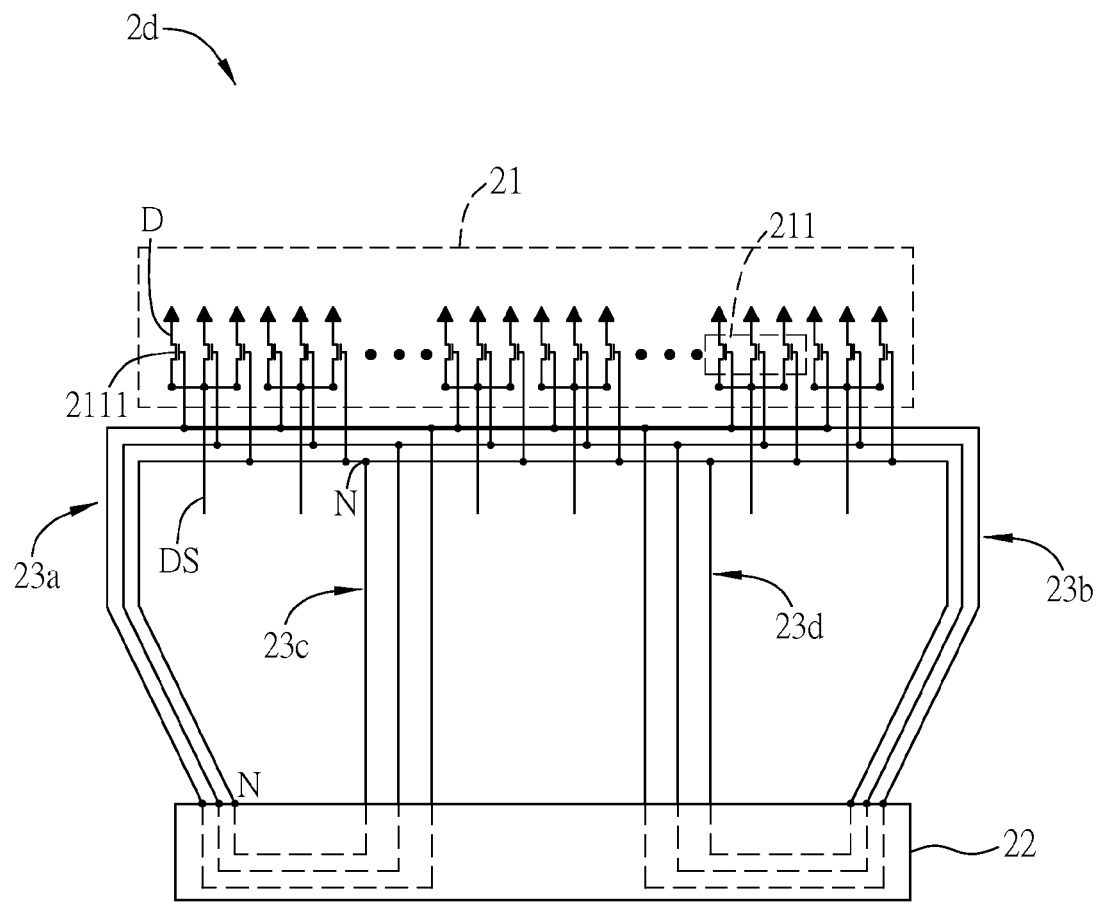

FIG. 5 is a schematic diagram of a display apparatus 2d of a variation of an embodiment of the invention. As shown in FIG. 5, the main difference from the display apparatus 2c is that a part of the third control line 23c and a part of the fourth control line 23d are disposed under the driving unit 22 and connected with the first control line 23a and second control line 23b on the substrate (not shown) respectively. Thereby, the size of the border area of the panel can be reduced.

Figure 6:
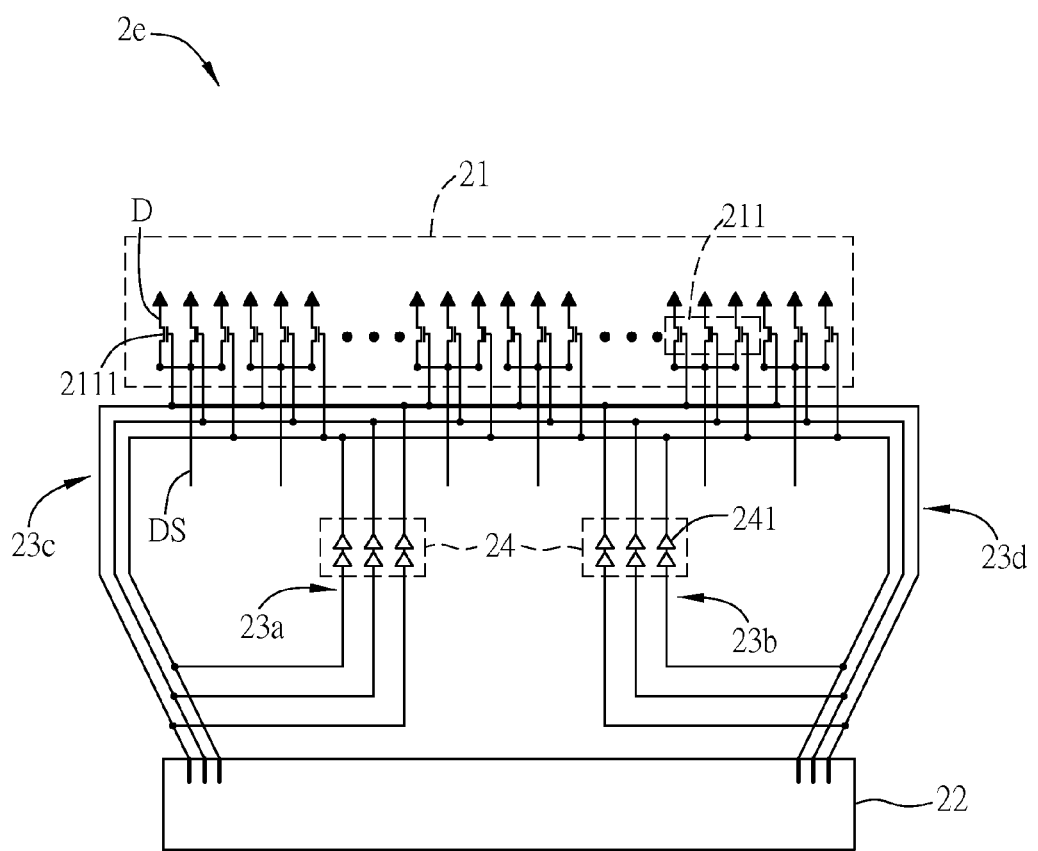

FIG. 6 is a schematic diagram of a display apparatus 2e of a variation of an embodiment of the invention. As shown in FIG. 6, the main difference from the display apparatus 2c is that the first control line 23a is connected with the multiplexer circuit 21 through a buffer unit 24 (to be noted, the position of the control line is changed in FIG. 6, which also indicates the first control line in the figures is just for the illustrative purpose, and the second control line, third control line or fourth control line all can be defined as the first control line. For example, the second control line, the third control line or the fourth control line all can be connected to the multiplexer circuit 21 through the buffer unit 24). Herein, the display apparatus 2e further includes two buffer units 24, which are electrically connected with the first control lines 23a and the second control lines 23b, respectively. Each of the buffer units 24 includes a plurality of buffers 241, and the buffers 241 are electrically connected with the first control lines 23a and the second control lines 23b, respectively. Because the maximum (delay) time constant is directly proportional to the ratio of the width to the length (W/L) of the buffer 241, the maximum time constant can be reduced by adjusting the length and width of the buffer 241. This embodiment can accelerate the control signal entering into the switch unit 2111 through the control line by adjusting the size of the buffer 241.

To be noted, the technical features of the above all embodiments can be implemented separately or together.

Figure 7:
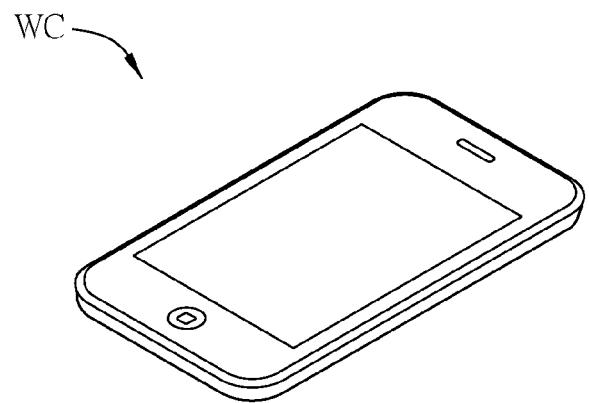
FIGS. 7 and 8 are schematic diagrams of the display apparatuses according to different embodiments of the invention.
Figure 8:
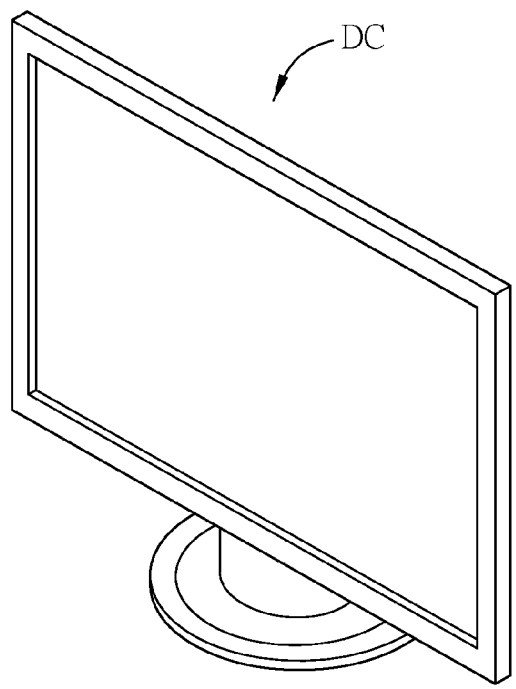

FIGS. 7 and 8 are schematic diagrams of the display apparatuses according to different embodiments of the invention. As shown in FIGS. 7 and 8, the display apparatus can be embodied as a wireless communication apparatus WC or a display screen DC.

Figure 9:
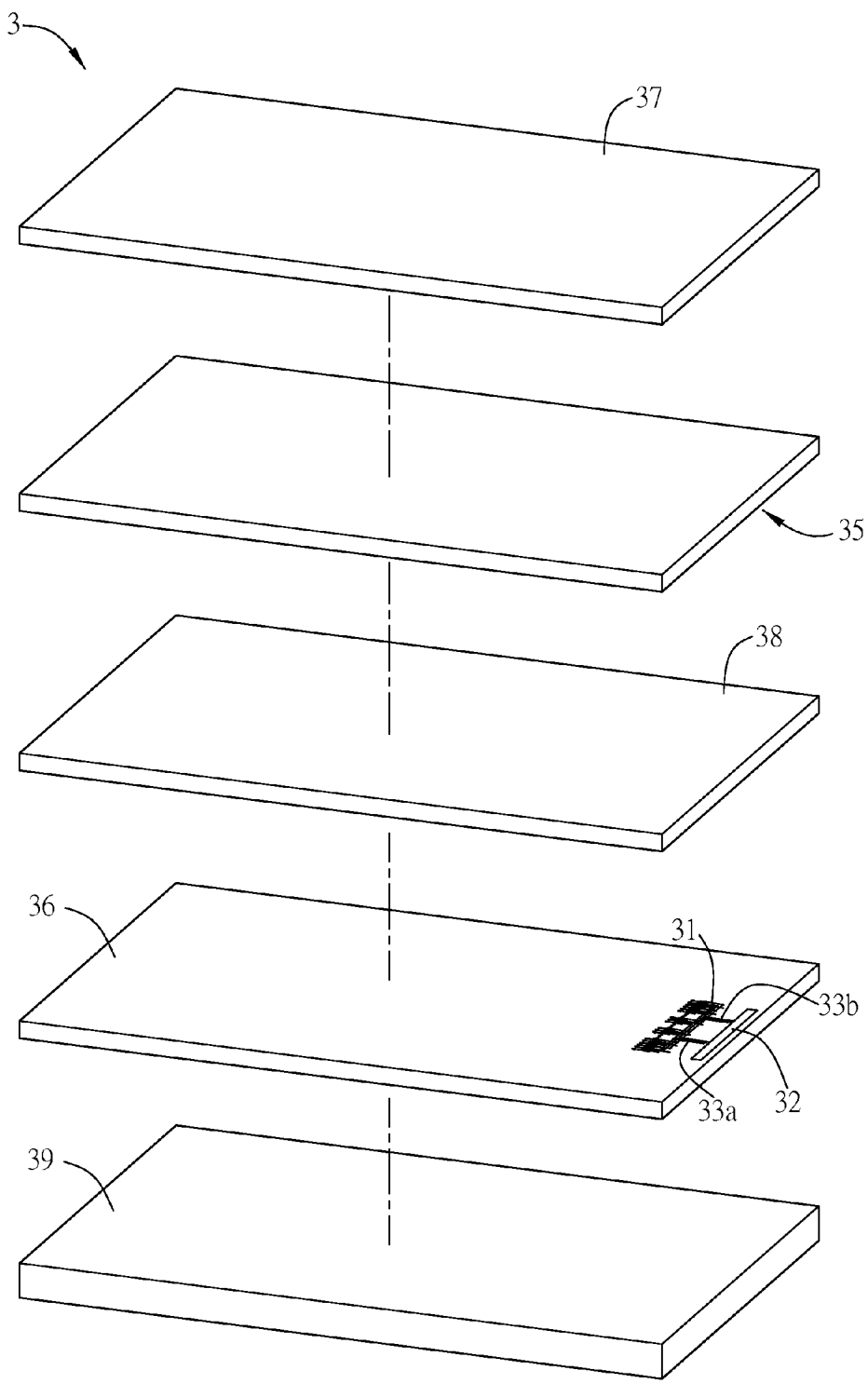
FIG. 9 is a schematic diagram of a touch display apparatus of an embodiment of the invention.

FIG. 9 is a schematic diagram of a touch display apparatus 3 of an embodiment of the invention. As shown in FIG. 9, the touch display apparatus 3 includes a touch circuit 35, a multiplexer circuit 31, a driving unit 32, the first control line 33a and the second control line 33b. The touch circuit 35, multiplexer circuit 31, driving unit 32 and control lines 33a and 33b are included in a display apparatus. Moreover, the touch display apparatus 3 can further include other components, such as a backlight unit 39 for providing light to achieve the image display function. In this case, the display apparatus and the backlight unit 39 are disposed oppositely.

The touch circuit 35 is not limited in type, which can be an in-cell type, on-cell type or out-cell type formed in the touch display apparatus and also can be made by the OGS (one glass solution) technology. The touch circuit 35 is electrically connected with the driving unit 32, and they can be electrically connected with each other directly or indirectly. When the touch circuit 35 receives a touch signal given by the external object, the driving unit 32 can convert the touch signal into the data signal to drive the pixels to display images correspondingly. The driving unit 32 is also electrically connected with the multiplexer circuit 31.

Furthermore, the touch display apparatus 3 further includes a substrate 36, which is a glass substrate for example. The multiplexer circuit 31, the driving unit 32, the first control line 33a and the second control line 33b are all disposed on the substrate 36. The touch display apparatus 3 further includes a protection board 37, and the touch circuit 35 can be disposed between the protection board 37 and the substrate 36. Herein for example, the touch circuit 35 is further disposed between the protection board 37 and a color filter substrate 38. Moreover, the display apparatus is disposed between the backlight unit 39 and the protection board 37.

Since the technical features of the multiplexer circuit 31, driving unit 32 and control lines 33a and 33b can be comprehended by referring to the above embodiments, the related illustration is omitted here for conciseness.

Summarily, in the display apparatus and touch display apparatus of the invention, the first control line and the second control line are disposed so that a maximum time constant from the driving unit to the switch units can be less than R*C/4. In comparison with the conventional art, this invention can reduce the maximum time constant so as to enhance the charging efficiency of the data line and further to enhance the display quality and efficiency. Besides, the charging time of the data line is shorter for the high-definition display apparatus and touch display apparatus, so the charging efficiency thereof is more important. Accordingly, this invention can bring more outstanding effectiveness when applied to the high-definition display product or touch apparatus.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display apparatus, comprising:
   a driving unit;
   a multiplexer circuit including a plurality of switch units;
   a first control line electrically connected with the plurality of switch units and the driving unit; and
   a second control line electrically connected with the plurality of switch units and the driving unit;
   wherein a maximum time constant from the driving unit to the plurality of switch units is less than R*C/4, R represents an equivalent resistance of a portion of the first control line between two switch units which are the farthest from each other, and C represents an equivalent capacitance of a portion of the first control line between two switch units which are the farthest from each other, wherein a connection node between the first control line and the multiplexer circuit is located between any two of the plurality of switch units.

2. The display apparatus as recited in claim 1, further comprising:
   a plurality of thin film transistor units; and
   a plurality of wires, wherein the multiplexer circuit is electrically connected with the thin film transistor units through the plurality of wires.

3. The display apparatus as recited in claim 1, the driving unit including a plurality of pins, wherein the first control line and the second control line are electrically connected to the different pins of the driving unit.

4. The display apparatus as recited in claim 1, further comprising:
   a third control line, wherein the first control line and the third control line at least have two connection nodes.

5. The display apparatus as recited in claim 4, wherein a part of the third control line is disposed under the driving unit.

6. The display apparatus as recited in claim 1, wherein the first control line is electrically connected with the switch units through a buffer unit.

7. The display apparatus as recited in claim 1, further comprising:
   a substrate on which the multiplexer circuit, the driving unit, the first control line and the second control line are disposed.

8. A touch display apparatus, comprising:
   a backlight unit;
   a protection board disposed above the backlight unit; and
   a display apparatus disposed between the backlight unit and the protection board, comprising:
   a substrate;
   a touch circuit disposed between the protection board and the substrate;
   a multiplexer circuit disposed on the substrate and including a plurality of switch units;
   a driving unit;
   a first control line electrically connected with the plurality of switch units and the driving unit; and
   a second control line electrically connected with the plurality of switch units and the driving unit;
   wherein a maximum time constant from the driving unit to the plurality of switch units is less than R*C/4, R represents an equivalent resistance of a portion of the first control line between two switch units which are the farthest from each other, and C represents an equivalent capacitance of a portion of the first control line between two switch units which are the farthest from each other, wherein a connection node between the first control line and the multiplexer circuit is located between any two of the plurality of switch units.

9. The touch display apparatus as recited in claim 8, wherein the driving unit is electrically connected with the touch circuit and the multiplexer circuit.

* * * * *